United States Patent Office 3,304,155
Patented Feb. 14, 1967

3,304,155
PROCESS FOR THE PRODUCTION OF BARIUM CARBONATE FROM BARIUM SULFATE
Eberhard Zirngiebl, Cologne-Flittard, Germany, assignor to Farbenfabriken Bayer Aktiengesellschaft, Leverkusen, Germany, a German corporation
No Drawing. Filed Mar. 12, 1964, Ser. No. 351,566
Claims priority, application Germany, Mar. 28, 1963, F 39,348
5 Claims. (Cl. 23—66)

The present invention is concerned with a process for the continuous production of barium carbonate from barium sulfate.

In the preparation of the caustic solution for alkali chloride electrolyses, considerable quantities of barium sulfate are formed. So far no economic method has existed for the return of this sulfate to the process.

With the conventional technical processes for the production of barium carbonate, finely ground heavy spar is reduced in a rotary furnace with carbon to barium sulfate which is then reacted in aqueous medium with carbon dioxide.

It is known that barium sulfate can be decomposed with aqueous soda solution if sodium carbonate is present in excess. Based on these facts, several technical processes for the production of barium carbonate have been developed, but they all have the disadvantage of needing large reaction vessels and containers since the operation is performed by batches. The process is economically inefficient on account of this intermittent operation.

In an investigation of the decomposition reaction between barium sulfate and sodium carbonate, it has now been found that the equilibrium corresponding to the formula $$[BaSO_4]/[Na_2CO_3]=k$$

where $k$ is a constant highly dependent on temperature, is rapidly adjusted to the decomposition side, especially when the decomposition is carried out at temperatures of 100° C. and higher. The reaction is hindered in the reverse direction.

A process for the production of barium carbonate by reacting the barium sulfate under pressure with excess dilute sodium carbonate solution has now been found wherein the decomposition is conducted continuously in the following stages:

(a) A 2–10 molar excess of barium sulfate is mixed with sodium carbonate solutions.
(b) The mixture is reacted under a pressure of about 1–10 atmospheres gauge in a heating zone with continuous withdrawal of the reaction mixture, the reaction mixture being cooled to temperatures below 100° C. by expansion and direct introduction into water, preferably at a temperature between about 10 to 35° C., whereby the average residence time of the reaction mixture in the reaction vessel amounts to about 5 to about 20 minutes.
(c) The barium carbonate is separated from this solution by known methods and washed.

Thus the barium sulfate suspension can be rapidly decomposed with high yields if the reaction mixture is cooled very quickly to temperatures below 100° C. If the reaction mixture stands for a relative long time, there are considerable losses of barium carbonate due to reformation of barium sulfate. With continuous decomposition, the mixture of barium sulfate and soda is pumped through a reaction vessel which is heated to temperatures of above 100° C. The reaction solution is then cooled as quickly as possible and the barium carbonate which has formed is filtered off. Yields of more than 85% are obtained.

By means of this continuous reaction, it is possible to reduce considerably the volume of the container or vessel. For example, to decompose 10 tons of barium sulfate per day, a reactor space of 0.6 cubic metre is sufficient using 50% barium sulfate sludge as starting material, a solution containing 250 g. of sodium carbonate and a molecular ratio between barium sulfate and sodium carbonate of 1:2 in the conversion. A residence time of about 15 minutes in the reactor is required. Carrying out the same reaction by means of an intermittent process, increases the residence time to at least one hour on account of the necessary starting, cooling and discharge times. This means that the reactor itself must be increased in size four times, i.e. to 2.5 cubic metres. All storage and mixing containers must be present in comparable sizes. Furthermore, using operation in batches, it is impossible to recover the heat introduced into the reaction mixture, whereas this can be effected without any particular difficulty using continuous operation, for example, by using preheaters.

It is preferred to decompose the barium sulfate with a 2–10 molar excess of sodium carbonate and to use pressures of from 1 to 10 atmospheres gauge in the reaction vessel. The aqueous solutions of sodium carbonate preferably contain 100 to 250 g. per litre of sodium carbonate and 5 to 50 g. per litre of sodium hydroxide. Autoclaves with high speed stirrers can be used as the reaction vessels. The reaction mixture can be removed using an adjustable nozzle or a valve which is intermittently opened. Furthermore, the reaction mixture can also be discharged through a special arrangement of hydrocyclones.

Example

About 0.4 ton per hour of a barium sulfate waste sludge is added to a stirrer-type container with a capacity of 500 litres. The sludge contains 60% of dry substance of the following composition:

| | Percent |
|---|---|
| BaO | 42.0 |
| $SO_3$ | 23.1 |
| CaO | 10.3 |
| MgO | 2.17 |
| $CO_2$ | 8.7 |
| Weight loss on ignition | 20.4 |

73 kg. per hour of 30% hydrochloric acid are run into the sludge, all impurities such as CaO and MgO being dissolved out. This suspension is now run through a rubber protected rotary filter. The sludge which forms and which is mainly composed of barium sulfate has the following dry substance composition:

| | Percent |
|---|---|
| BaO | 63.2 |
| $SO_3$ | 33.9 |
| CaO | 0.35 |
| MgO | 0.12 |
| $CO_2$ | 0.24 |

This sludge is now mixed in a vessel with a capacity of about 500 litres and having an efficient stirrer with 0.635 cubic metre per hour of a solution which contains 220 g. per litre of sodium carbonate and 20 g. per litre of NaOH. The sodium carbonate-barium sulfate sludge is passed through a 500-litre storage vessel and then forced into a stirrer-type autoclave heated to 220° C., a pressure of 8–10 atmospheres gauge being set up. The reaction vessel has a capacity of about 200 litres so that the average residence time is about 12–15 minutes.

The material discharging from the autoclave is sprayed by means of an intermittently opening valve directly into a large quantity of water, being cooled by expansion and quenched to 20–30° C. This large quantity of water is conducted cyclically through a condenser, as much solution being removed as is added by the reacted material sprayed in. The barium carbonate suspended in water and which is formed by the decomposition reaction is filtered off through a rotary filter. The barium carbonate sludge which is obtained has the following composition (as dry substance):

| | Percent |
|---|---|
| BaO | 73.9 |
| $CO_2$ | 21.1 |
| $SO_3$ | 1.5 |
| CaO | 0.3 |
| MgO | 0.14 |

The barium carbonate yield using continuous working method is 85 to 90% calculated on the input of barium sulfate. The sludge formed can either be further processed after drying at 100° C. to a powder form containing about 1% of water or can be used as a paste without drying.

I claim:

1. Process for the continuous production of barium carbonate by decomposing barium sulfate under pressure with excess dilute sodium carbonate solution, the steps which comprise mixing the barium sulfate with an aqueous solution of sodium carbonate using a 2 to 10 molar excess referred to the barium sulfate, feeding the mixture continuously into a heating zone, wherein said mixture is boiled under a pressure of 1 to 10 atmospheres with an average residence time of the reaction mixture in the heating zone of about 5 to 20 minutes, withdrawing said mixture continuously from said heating zone under expansion and introducing into water, whereby said reaction mixture is cooled to temperatures below 100° C. and separating off the barium carbonate formed from the aqueous suspension.

2. Process according to claim 1, wherein the average residence time of the reaction mixture in the heating zone amounts to about 12 to 15 minutes.

3. Process for the continuous production of barium carbonate by decomposing barium sulfate under pressure with excess dilute sodium carbonate solution the steps which comprise mixing the barium sulfate with an aqueous solution containing 100 to 250 g. per litre of sodium carbonate and 5 to 50 g. per litre of sodium hydroxide using a 2 to 10 molar excess of sodium carbonate referred to the barium sulfate, feeding the mixture continuously into a heating zone, wherein said mixture is boiled under a pressure of 1 to 10 atmospheres with an average residence time of the reaction mixture in the heating zone of about 5 to 20 minutes, withdrawing said mixture continuously from said heating zone under expansion and introducing into water, whereby said reaction mixture is cooled to temperatures below 100° C. and separating off the barium carbonate formed from the aqueous suspension.

4. Process according to claim 3, wherein the average residence time of the reaction mixture in the heating zone amounts to about 12 to 15 minutes.

5. Process according to claim 3, wherein the reaction mixture is cooled to temperatures of about 20 to 30° C.

References Cited by the Examiner

UNITED STATES PATENTS

| 1,615,515 | 1/1927 | Marwedel et al. | 23—66 |
| 2,213,907 | 9/1940 | Fleckenstein et al. | 23—66 |
| 2,440,641 | 4/1948 | Minnick | 23—66 |
| 3,029,133 | 4/1962 | Goodenough | 23—66 |

OSCAR R. VERTIZ, *Primary Examiner.*

G. L. OZAKI, *Assistant Examiner.*